(12) United States Patent
Sanz et al.

(10) Patent No.: US 6,481,486 B1
(45) Date of Patent: Nov. 19, 2002

(54) MODULAR AIRCRAFT WINDOW WITH A DUAL SHADE

(75) Inventors: Eduardo Sanz, San Antonio, TX (US); Gilbert Moreno, San Antonio, TX (US)

(73) Assignee: MSA Aircraft Products, Ltd., San Antonio, TX (US)

( * ) Notice: Subject to any disclaimer, the term of this patent is extended or adjusted under 35 U.S.C. 154(b) by 0 days.

(21) Appl. No.: 09/500,298

(22) Filed: Feb. 8, 2000

(51) Int. Cl.[7] .................................................. A47H 5/00
(52) U.S. Cl. ........................ 160/84.06; 160/90; 160/107
(58) Field of Search ............................. 160/107, 84.04, 160/84.05, 84.06, 90, 172 R

(56) References Cited

U.S. PATENT DOCUMENTS 4,679,610 A * 7/1987 Spraggins
4,825,929 A * 5/1989 Haines
5,082,043 A * 1/1992 Moreno

* cited by examiner

Primary Examiner—Blair M. Johnson
(74) Attorney, Agent, or Firm—Jackson Walker LLP

(57) ABSTRACT

A vehicle window having a curved inner lens, a rectangular frame with frame members and a shade. The shade is a dual shade having a first fabric member and a second fabric member with a removable shade rail between the first and second fabric member. There also is a movable shade rail at the end of the second shade material. Cables attach to each end of the removable shade rails and through to separate handles. Moving the first handle will move the first moveable shade rail and the first fabric member up and down and moving the second handle will move the second moveable shade rail and the second fabric up and down. The fabric members have different light transmissive characteristics, one being more opaque then the other.

16 Claims, 8 Drawing Sheets

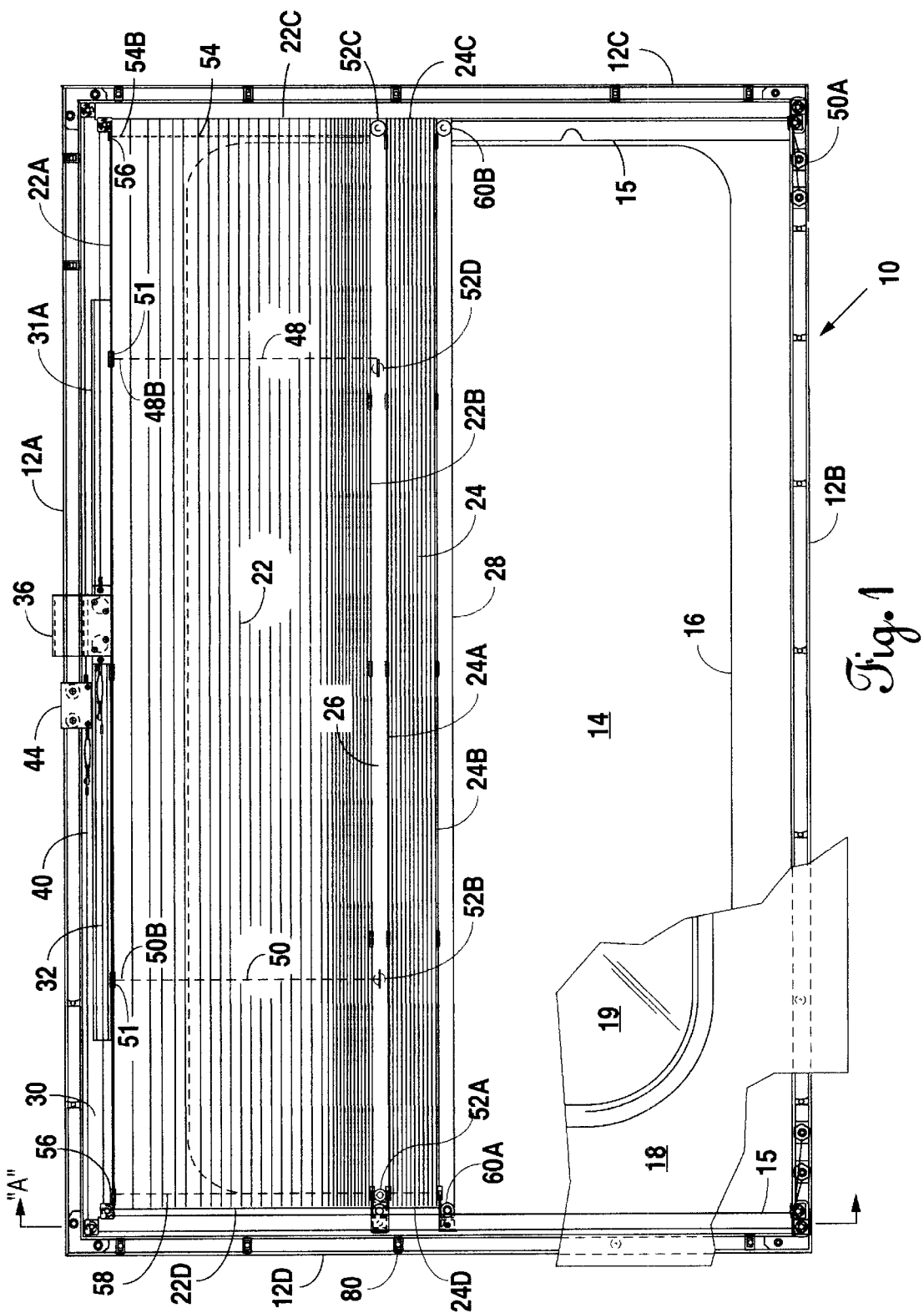

MODULAR AIRCRAFT WINDOW WITH A DUAL SHADE

FIELD OF THE INVENTION

Modular windows for vehicles, more specifically a modular window for an aircraft, the modular window having a dual shade.

BACKGROUND OF THE INVENTION

Modular windows for aircraft typically include a shade material which has uniform light transmissive capabilities. For example, a modular aircraft window may have a window shade made of a material that is almost opaque. Therefore, when the window shade is down, almost no light will enter the cabin of the aircraft from the outside. Sometimes this is desired, as, for example, when the passengers wish to view an in-flight movie. On the other hand, if the passengers desire some but not full light, they can take such an opaque window shade and move it to a position between fully opened (letting all the light come through the window) and fully closed (blocking light). Such a situation is sometimes satisfactory. However, harsh shadows can be created in such partially opened condition. Occasionally, a translucent shade material better fits the needs of the occupants of the aircraft. With such a translucent shade material, the shade, when in a fully down or closed position will allow some light to pass through and will diffuse the light, and thus illuminate the interior of the aircraft with natural light that is softened and whose intensity is lessened.

However, ideally, since lighting requirements for the interior of the aircraft cabin will vary, utility is realized in providing an aircraft window with a dual fabric system, the two fabrics of the shade having different properties, for example one of the two fabrics may be more light transmissive than the other (for example, sheer and opaque).

Applicant's present invention realizes such utility in providing an aircraft window that uses two fabric panels, one located between a stationary top rail and removable centered rail and the second located between the centered rail and the moveable bottom rail. With each of the two moveable rails independently operated by the aircrafts occupant, the occupant may readily provide for the aircrafts lighting needs. This is especially so when one of the two fabrics is more light transmissive than the other. For the sake of illustration, one fabric may be sheer and the other opaque, providing the occupant with a choice of either fabric or, a combination of the two fabrics to more efficiently meet his needs.

Further utility lies in providing the window in modular form. Modular form means that the elements of the window (frame, shade, shade control mechanism, etc.) Are constructed into a single unit, which is then installed into an aircraft either when the aircraft is built or subsequently, when the aircraft is modified.

Still further utility lies in providing the modular window with at least an inner pave or lens. This will allow the installed window to isolate the shade between a pair of lenses. This helps keep the shade clean, helps insulate the aircraft interior from heat and noise and is found by some to have aesthetically pleasing qualities.

All of these advantages must be realized while providing for a window that, when viewed from the side, must be narrow (aircraft cabin space is expensive) and curved to match the curves of the aircraft interior and fuselage. Providing the curve to the frame and shade raises problems not encounted in, buildings designing windows for such as homes.

One such problem a curved design present is in rasing and lowering the shade. A vertically hung shade can use the force of gravity to allow it to fall vertically. To follow a curved path, the shade must be positively guided and the force of gravity may not provide for a smooth movement of the shade. Therefore a shade movement system imparted downward force to the shade, which must maintain the shade in proper alignment as it moves.

OBJECT OF THE INVENTION

It is the object of the present invention to provide for a modular aircraft window having a curved frame which more effectively meets the lighting requirements for the cabin of the aircraft interior.

SUMMARY OF THE INVENTION

This and other objects are provided for in a modular aircraft window with a curved frame having a manually operated shade, the shade comprised of two fabric panels independently operated so the aircraft occupant may selectively locate the first panel over none, some or all of the aircraft window, or the second panel over all, some or none of the aircraft window or, in fact the occupant may cover all or some of the window partially with the first fabric panel and partially with a second fabric panel.

DESCRIPTION OF THE PREFERRED EMBODIMENTS

Figure 1B:
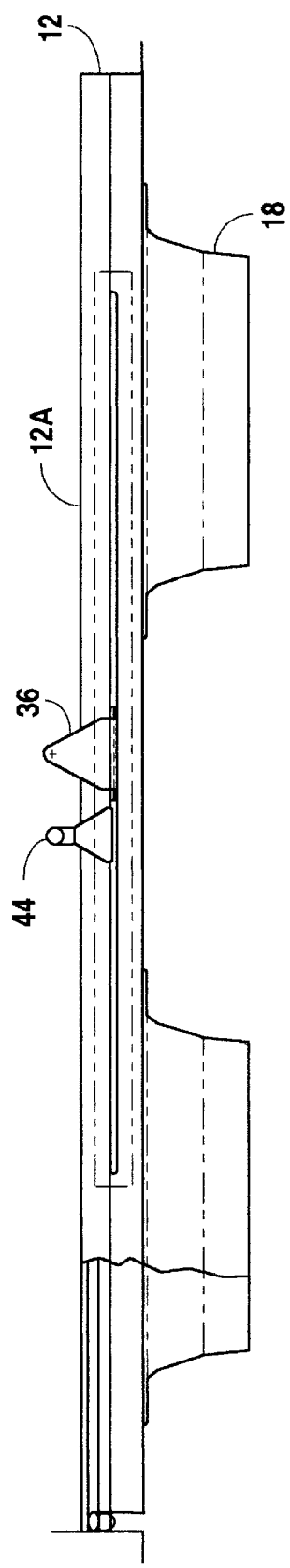
FIGS. 1 and 1A are front elevational and top elevational views respectively of the invention.

FIGS 1, 1A, 2, 3A and 3F illustrate some of the major components of Applicant's unique modular, dual shade aircraft window. More specifically, these figures illustrate a modular aircraft window 10. The aircraft window is seen to comprise of a generally rectangular frame 12, typically made of aluminum or other suitable material. The frame typically includes a straight upper member 12A, a straight lower member 12B, dimensioned similarly to the upper member, and two side members 12C and 12D, the side members being curved when the vehicle window is viewed from the side (see FIG. 2). When viewed from the front or rear the frame defines a rectangle. The four members of the frame are typically attached to one another through the use of four corner braces 12E. The frame members typically define, in cross-section, at least particularly a channel shape with the arms of the corner braces sitting within the channels (see FIGS. 1 and 2).

An inner lens 14, typically transparent plastic or Lexan®, is secured to the inner perimeter of the frame and typically a decorative mask 16 is provided adjacent the frame members to help mask some of the mechanical components that are located near the inner edges of the frame members, as set forth in more detailed below. Optionally, mask 16 is provided with abrasion tape 15 on the inner surface thereof so that some of the moving mechanical components that operate by sliding up and down along the interior of the window shade do not scratch the mask. Here it is understood that the inner lens is the lens that faces the cabin of the aircraft and prevents dust and other debris from accumulating on the shade material of the aircraft window. Further, by providing an inner lens noise and heat transmission between the exterior and interior of the cabin is also attenuated.

Applicant's aircraft window 10 may also be provided with a reveal 18 such as one made out of plastic, composite or fiberglass. The reveal partially to shroud and protect the window shade and may include an outer lens 19 or may be simply left opened and shaped to be placed adjacent or against the exterior aircraft window. The effect of using the outer and inner lens (or placing the reveal against the outer window of the aircraft) is to seal the shade between an inner lens and an outer lens to prevent dust and dirt accumulation thereon and to help minimize the transmission of sound and heat between the exterior and interior of the aircraft.

Turning now to shade 20, it is seen, especially with reference to FIG. 1, that the shade is comprised of a first fabric member 22 and a second member 24. Further, the first fabric member has a top edge 22A, a bottom edge 22B and a pair of side edges 22C and 22D. Likewise, the second fabric member 24 includes a top edge 24A, a bottom edge 24B, and a pair of side edges 24C and 24D. Both fabric members are seen to define, typically, a generally rectangular shape. Typically, they may be pleated honeycomb or tubular in cross-section. Preferably they are either pleated or honeycomb. Typically, the two fabric members have different properties and more typically have to different light transmissive properties, one of the two shade members allowing light to pass through more easily than the second of the two fabric members.

Figure 5:
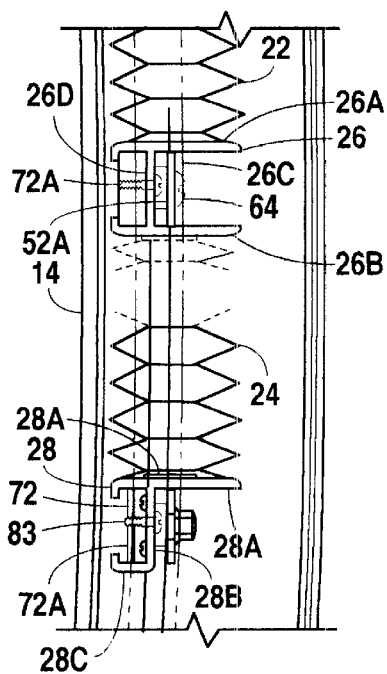
FIG. 5 illustrates details of the shade rail ends of Applicant's present invention including structure associated therewith.

It is also apparent with reference to the illustrations, especially FIG. 1, that between the bottom edge of the first fabric member and the top edge of the second fabric member is located a first moveable (intermediate) shade rail 26 that, in cross-section may be "H" shaped (see FIG. 5). At the bottom edge 24B of the second fabric member 24 is located a second moveable (end) shade rail which may be chair shape in cross-section (see FIG. 5). A third (fixed) shade rail 30 is located adjacent upper member 12A of the frame and has attached thereto top edge 22A of the first fabric member. The third shade rail 30 may itself be mounted to an elongated tubular, typically aluminum, mounting member 31 that is attached to and engaged adjacent the lower edge of the upper frame member. Also, mounting. member 31 may have attached thereto a channel section member 31A. The further function uses of these mounting members will be set forth in more detailed below.

With further reference to FIGS. 1, 1A, 2, 3A–D and 4E Applicants provide a first shade rail control mechanism, the function of which is to selectively position the first shade rail, and therefore position the shade with respect to the frame and inner lens, so as to control, for example, the amount of light entering the interior of the aircraft from the exterior. The first shade rail control mechanism is seen to comprise a first cable loop 32, the loop typically entrained adjacent the rectangular frame on corner mounted first cable corner pulleys 34A, 34B, 34C and 34D. The loop is attached to one end of the first moveable shade rail-here, for example, the left end as viewed in FIG. 1. Attached to the first cable loop, typically along a section of the first cable that runs adjacent to upper frame member 12A is located a moveable handle 36. Preferably, the handle is mounted to the first cable loop through the use of a turn buckle 38. Movement of the handle will cause movement of the first shade rail to move up and down. Here it is noted that first cable loop 32 is rigidly attached to the left end of first shade rail 26 so that when the handle moves longitudinally across the upper member of the frame, the first shade rail 26 will move up and down. Furthermore, it may be appreciated with reference for figures, for example, FIG. 1 and FIG. 4E, that rotating a barrel of the turn buckle 39 will tighten or loosen the first cable loop. It is noted here that the first cable loop is not attached to either of the other two shade rails, and that movement of the first cable loop moves only the first shade rail, unless the first shade rail physically compresses against the second shade rail (for example, with reference to FIG. 1, when the first shade rail is moved down).

Applicant provides a second shade rail control mechanism independent of the first shade rail control mechanism but similar thereto. The second shade rail control mechanism is comprised of a second cable loop 40 entrained around four corner mounted second cable corner pulleys 42A, 42B, 42C and 42D. Attached to the second cable loop 40 is a handle 44, typically moveably attached adjacent upper frame member 12A and designed so that it my slide past or nest with the handle 36 of the first shade rail control mechanism. Turn buckle 46 may be used to engage handle 44 to second cable loop 40 thus providing a means to adjust the tension in second cable loop 40 as it is entrained around the perimeter of the frame of the vehicle window. That is, second cable loop 40 is attached to, typically, one end of second moveable shade rail 28 such that when handle 44 is moved second shade rail 28 will move up and down (between an open and a closed position) as set forth in FIG. 1. Further, it can be appreciated that second shade rail mechanism operates independently of the first shade rail control mechanism (unless when the first shade rail is being moved up as set forth in FIG. 1 it strikes the bottom of the first shade rail 26 as seen in FIG. 1).

Applicants vehicle window is preferably provided with means to maintain a parallel alignment between the shade rails and the upper end lower frame members such that they are horizontally aligned as illustrated in FIG. 1. Because, typically, Applicants shade rail control mechanism operates by attaching to one end of their respective shade rails, a shade rail alignment system is preferred. Applicants provide a first shade rail alignment system and a second shade rail alignment system for proper alignment of the first and second shade rails with respect to each other and to the frame and so they do not get caught at an angle while being raised or lowered.

Figure 3A:
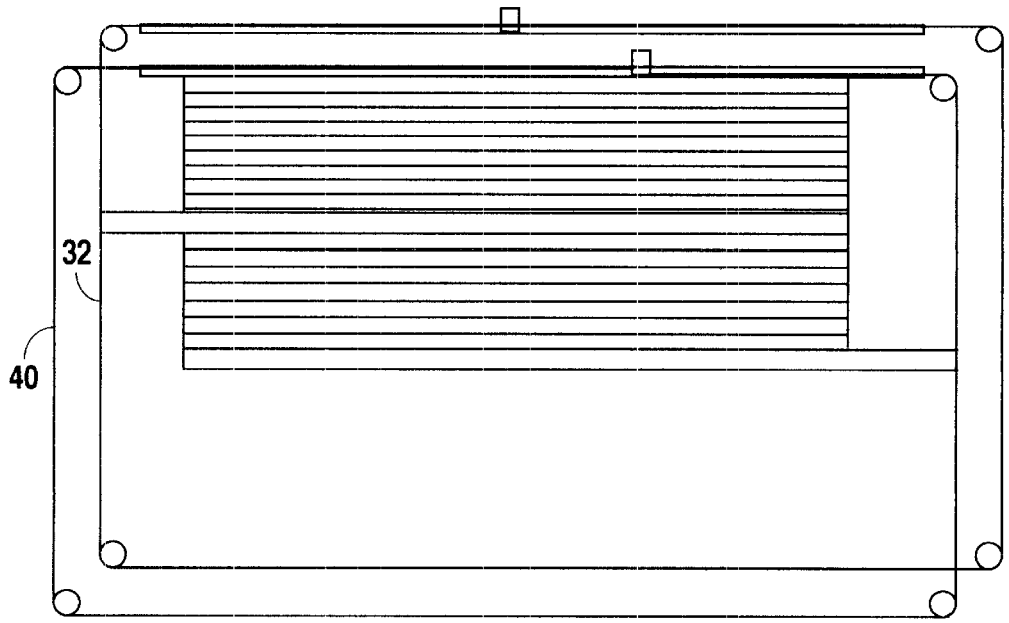
FIGS. 3A, 3B, 3C, 3D, 3E, 3F, 3G and 3H are all elevational views of various details of Applicant's present invention, including the details of the manner in which strings or cords are used to move the shade rails up and down and the system of cords or strings that allow the maintenance of the shade rails in their parallel alignment.
Figure 3B:
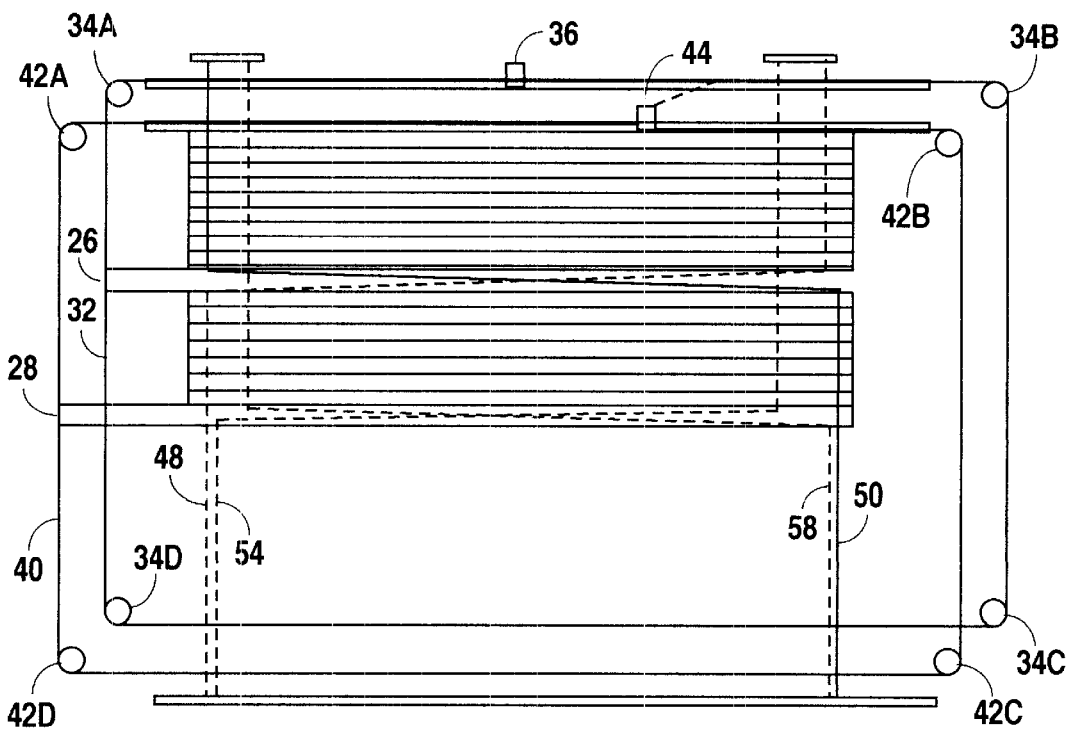
Figure 3C:
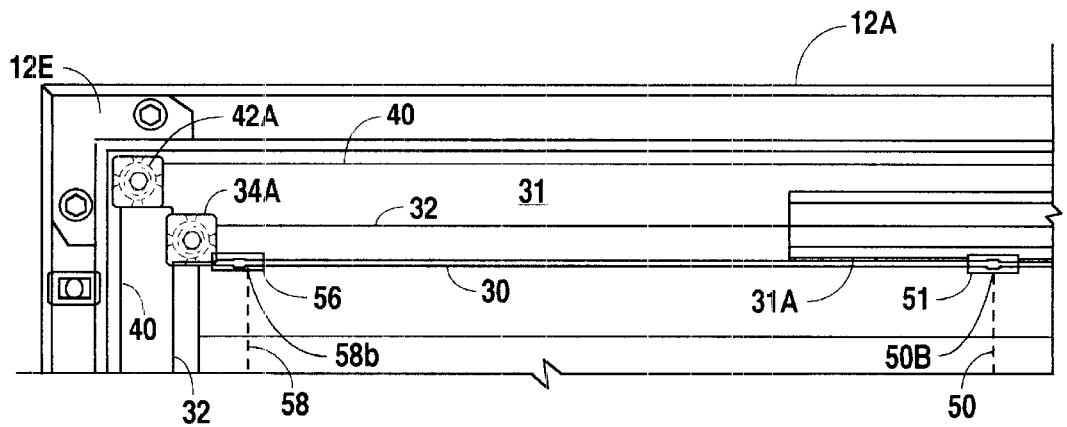
Figure 3D:
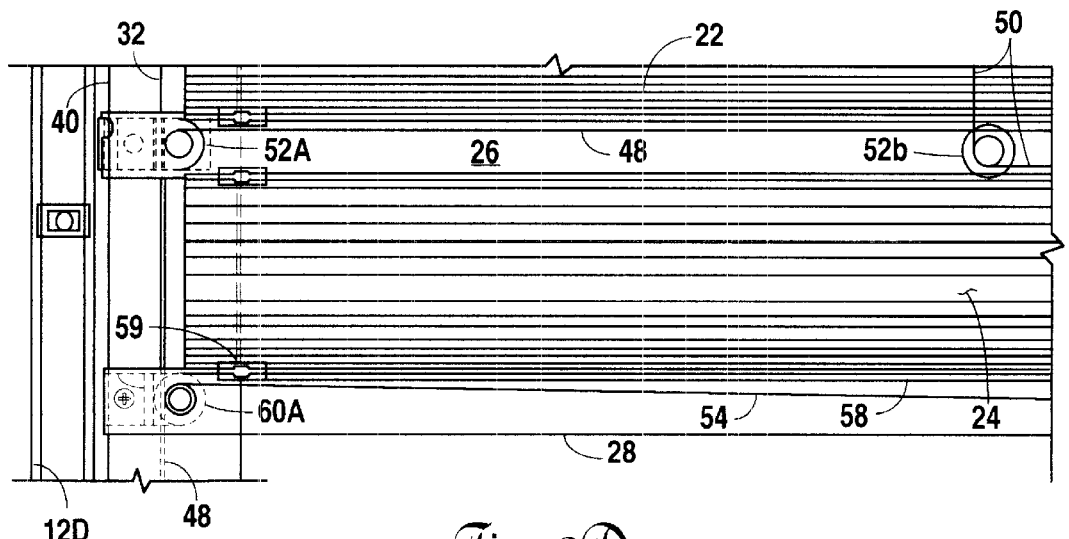
Figure 3E:
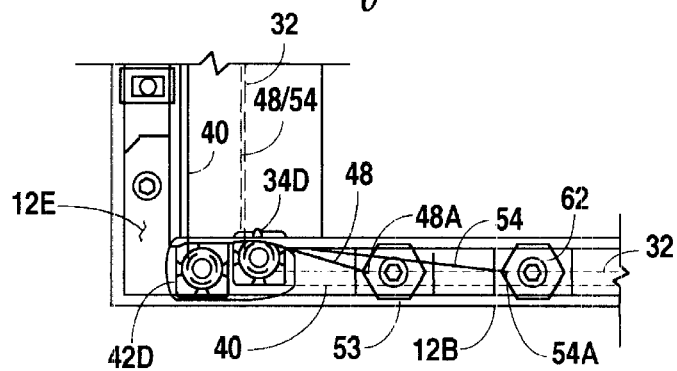
Figure 3F:
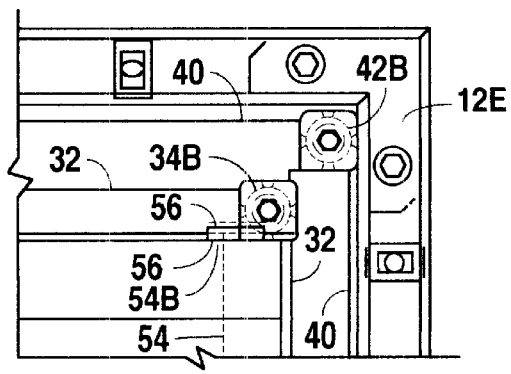
Figure 3G:
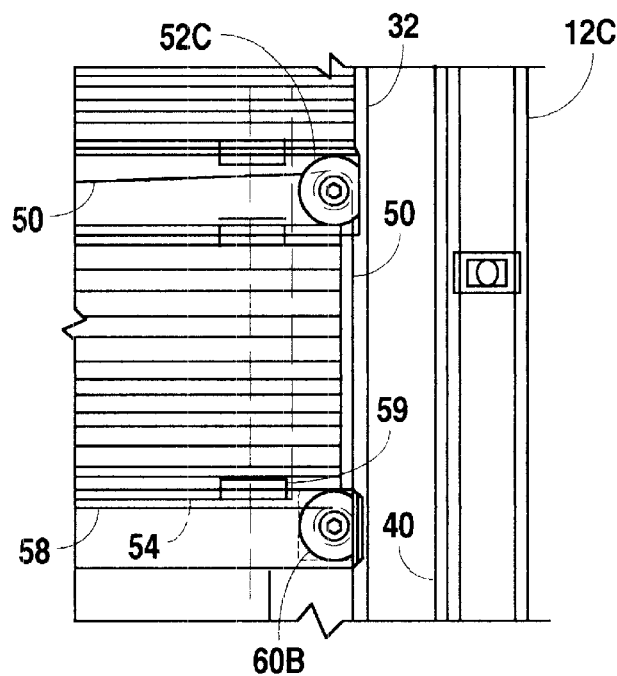
Figure 3H:
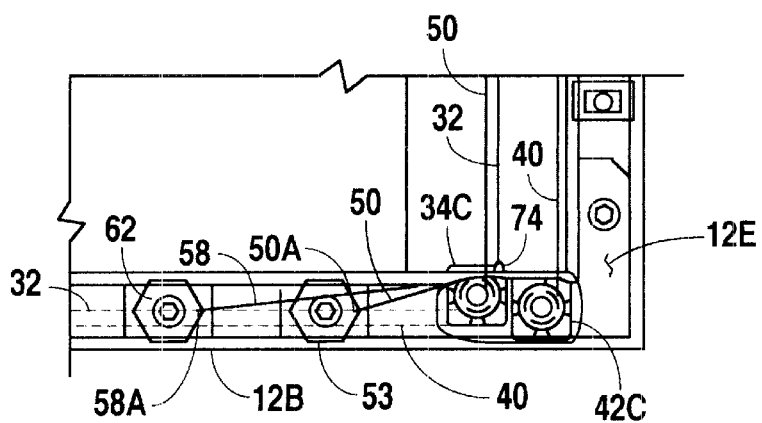
Figure 4A:
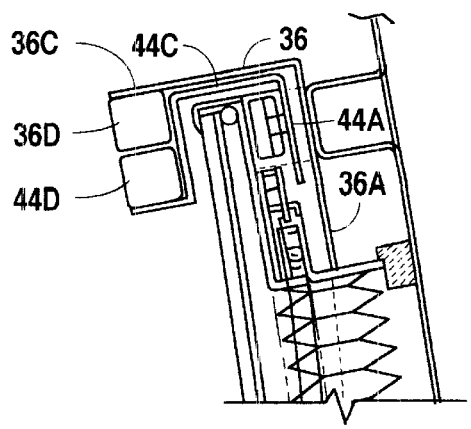
FIGS. 4A, 4B, 4C and 4D present elevational views and FIG. 4E an isomatric view of the handles for use with the invention, to raise and lower the shade rails.
Figure 4B:
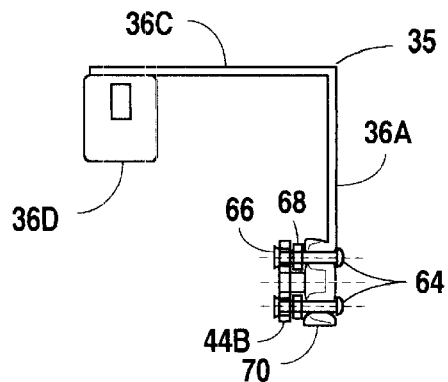
Figure 4C:
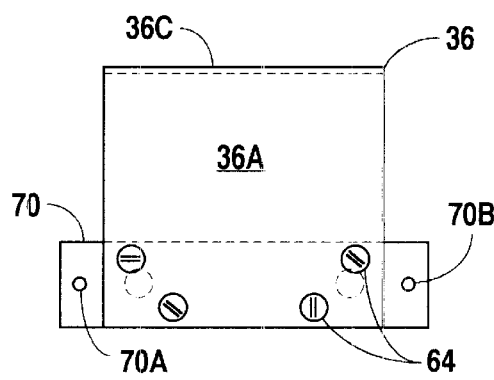
Figure 4D:
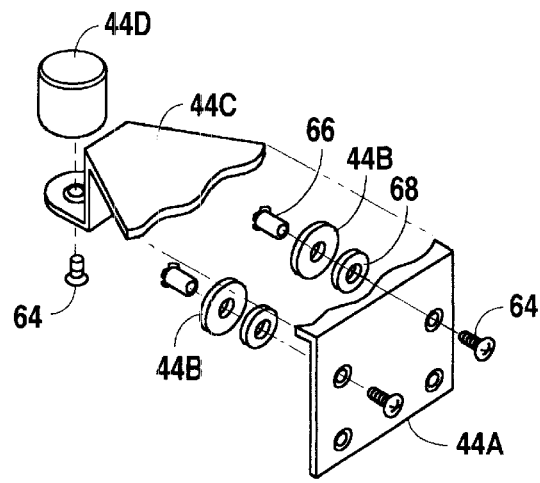
Figure 4E:
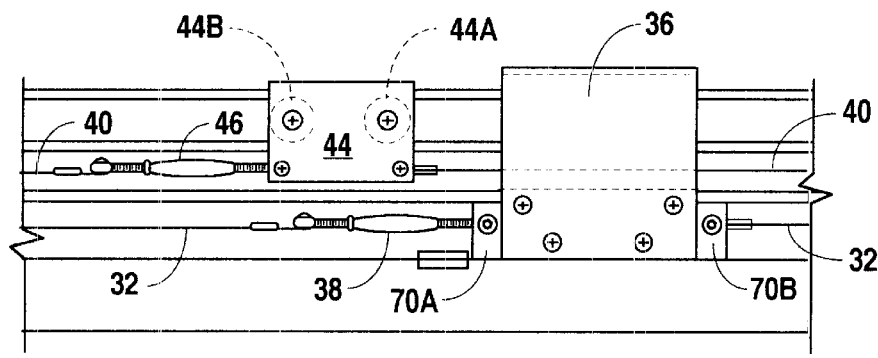

FIGS. 1, 3E and 3H illustrate the components of Applicants first shade rail alignment mechanism including a first cord 48 having a first end 48A and second end 48B and a second cord 50 having a first end 50A and a second end 50B. The first shade rail alignment mechanism also includes the first and second cord tie off points 51 and shade rail pulleys here, four illustrated as 52A, 52B, 52C and 52D, as well as a pair of adjustable tie off lock plates 53.

In FIGS. 3E and FIG. 1 it is seen that the first cord 48 is tied off at first end 48A to adjustable lock plate 53, typically located in cooperative engagement with lower frame member 12B along the lower left hand portion of FIG. 3E. Cord 54 passes through hole 74 (see FIG. 6) in the lower frame member and is directed upward along the inner edge of left side member 12C until it reaches shade rail pulley 52A located at the left end of shade rail 26, where it undergoes a change of direction of approximately 90° and then runs across the first moveable shade member.

Until it reaches pulley 52D (see FIG. 1). Here it turn 90° to go through the shade rail and shade panel 22 until being tied off at second end 48B to tie off point 51.

Turn for a moment to second cord 50 and it is seen that, like first cord 48, second cord 50 is tied off at first end 50A to adjustable lock plate 53 and passes through the lower right hand corner of the lower frame member at hole 74, is directed from there vertically upward adjacent the inner edge of the right side frame member 12C. When it reaches shade rail pulley 52C, it undergoes an approximate 90° change in direction and is directed across shade rail 26 until it reaches shade rail pulley 52B. Here it is directed upward through the pleats of shade 22 (so as to be invisible from the interior of the aircraft) until it is tied off at removed end 50B at tie off point 51. This tie off point is typically located along generally L shaped stationary third shade rail 30. It is noted here that first shade rail alignment system does not engage the second moveable frame rail nor does the first cord 48 engage second cord 50. Furthermore, both cords may have the tension in the cord adjustable at adjustable lock plates 53. These plates comprise a screw 53A and two plate members. When the screw is loosened the plates 53B and 53C may slide along the inner channel of the lower frame member and when the desired tension is reached, the screw can be rotated to cause the plate members to press against the inner lips and leg of the channel (see FIG. 6A).

The second shade rail is also provided with a rail alignment mechanism, as best viewed in FIGS. 1, 3A and 3B, 3C, 3D, and 3E. The second shade rail alignment mechanism is seen to comprise a first cord 54 with the first end 54A and 54B and a second cord 58 with a first end 58A and a second end 58B. The first and second cords are tied off at lock plates 62 typically located in the lower left and lower right hand corners respectively of the frame members. Like the first cord and second cord of the first shade rail alignment mechanism 48 and 50, the first and second cords of the second shade rail alignment system pass through hole 74 in the two opposed corners of the lower frame member are typically directed upward generally inline with the cords of the first shade rail alignment system until the two cords respectively meet the second shade rail pulleys 60A and 60B located adjacent the two removed ends of second shade rail 28 as set forth in FIGS. 3D and 3G. Near the outer ends of the shade rail 28 are holes 59 which allow the two cords to be directed upwards through the pleats (so as not to be seen from the interior of the cabin) upward through or past the first shade rail, to attach typically to the third, stationary shade rail 30 at the two tie off points 56 located in the upper right hand and upper left hand corners of the frame.

It is noted that there are some differences in the structure of the two shade rail alignments systems but both shade rail alignment systems provide for maintenance of the parallel alignment of the two shade rails and hide from view the mechanical components and cords thereof. Some shades are known to have cords that lay across the window or other architectural opening when the shade systems are raised. Although these cords do not block much light, they are aesthetically less desirable then those shade systems that provide a clear view.

FIGS. 4A through 4E provide details of Applicants handles and how they engage and cooperate with the top frame member and associated structure to allow the handles to slide parallel with the top member to smoothly move the two moveable shade rails between an opened and closed position. First, and here with reference to FIG. 1, it may be appreciated that handle 36 is designed to slide in channel section 31A which is mounted to mounting member 31 and handle 44 is designed to slide within the channel portion of upper frame member 12A. Further, and with reference to FIGS. 4A through 4D is seen that the handles can slide so they may be positioned next to one another. Note that, preferably, the two cable loops are attached to their respective shade rails and their handles such that the two handles "nest" together (see FIG. 4A) when the two moveable shade rails are as closed together as the compressed shape panel 24 will allow. This is best appreciated with reference to FIG. 4A and FIG. 1.

Handles 36 and 44 are seen to be similar but not identically shaped. Both handles have base plates 36A and 44A respectively, the base plates having sliders, typically a pair or sliders 36B and 44B attached thereto for engagement with the channel section of the upper frame member 12A and 36B channel section 31A (44B). The base plates of each of the handles are seen to be attached, along their upper edge, to arm portions 36C and 44C respectively. It is seen that the arm portions are shaped so that nobs 36D and 44D, attached to the removed ends of arms 36C and 46C respectively, may be attached to nobs (typically cylindrical) which can align in the attractive configuration illustrated in FIG. 4A.

Turning now to the details of the sliders (see FIG. 4A), it is seen that both base plates have sliders 44B attached thereto, which sliders may be made of, typically, nylon. These are attached typically with a pair of spacer disks 68 on axles or standoffs 66 which are affixed via a threaded bore and screws 64 to base 44A of handle 44. On the other hand, base plate 36A of handle 36 has a spacer plate 70 (rather than disks) which will space the handle so that it may pass or at least nest with handle 44 (see FIG. 4A). Sliders 44B are mounted to spacer plate on axles 66 and screws adjacent the inner face of spacer plate. With reference to FIG. 1 and FIG. 3 it is seen that spacer plate 70 may have an outwardly projecting turn buckle mounting stub 70A and a first cable loop mounting stub 70B attached thereto.

It is noted here that we refer to the first and second cable 32 and 40 respectively as loops, but this phrase also refers to the handle portion, as part of the loop. Indeed, the ends of the loop may be tied off at the turn buckles and handles or spacer plate. Thus the term loop is not specifically defined as just a single continuously entrained cord, but one that may be tied off at various points, but that when on portion moves, so does the other.

Figure 2:
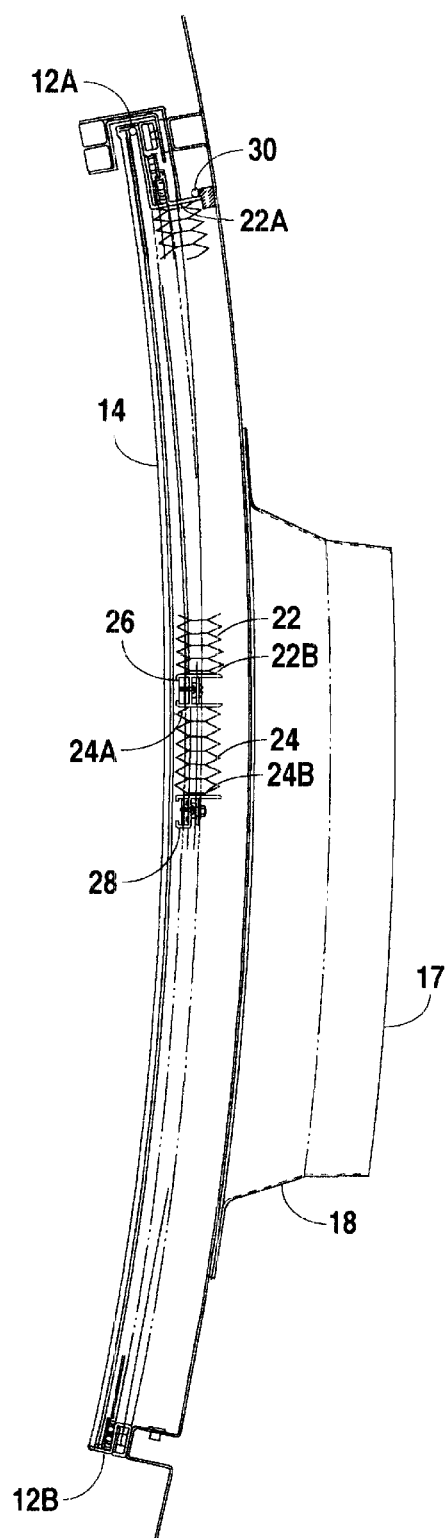
FIG. 2 is a side elevational view of the invention.

FIGS. 1, 2 and 5 provide additional details of the two moveable shade rails, especially the end portions thereof. Turning now to FIG. 5 it is noted that the cross-section of movable shade rail 26 is "H" shaped, the "H" laying sideways. The cross-section of first removable shade rail 26 is seen to have a top plate 26A, a bottom plate 26B and a cross plate 26C. A pair of cord slots 26D are cut into the outboard sections of the top and bottom plate to allow the passage and affixing, via cord gripper plate 72 of first cable loop 32 thereto.

Second shade rail 28 is seen to be generally "chair" shaped, with chair laying on its side, the chair shaped shade rail (in cross-section) having a back 28A, a base 28B and leg 28C. Slots 76 may be provided therein for the passage of first cable loop 32 there through in such a manner that it does not interfere with second shade rail 28. Further, slots may be used to engage second cable loop 40 through the use of a cord gripper plate 72 which, in cooperation with the cord gripper plate screw can compress the cable loops against the cross plate 26C and base 28B of the two shade rails respectively when the screw is tighten to thread the inner face of the gripper plate against the underside (outward side) of the cross plate and base respectively.

Figure 6:
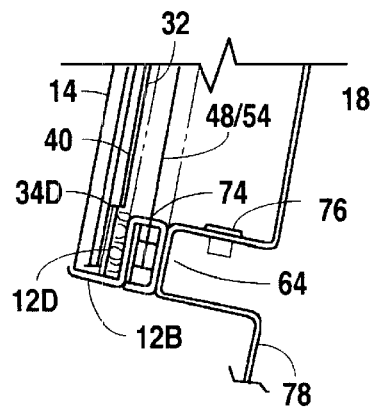
FIG. 6 and 6A illustrate details of the lower left-hand and right-hand corners of Applicant's invention.
Figure 6A:
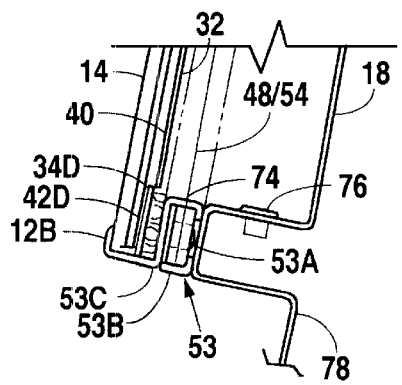

FIGS. 6 and 6A illustrate details of the lower left and lower right corners of the lower frame member 12B. More specifically, with reference to FIG. 6 the channel shape of the cross section of the frame member may be appreciated. That is, on one side of the channel, here the right side is illustrated in FIG. 6 may be located two (per corner) adjustable lock plates. The plate portion of the lock plates is designed to slide within the channel section of the lower frame member to adjustably set tension for the cords of the first and second shade rail alignment mechanisms. On the other hand, the under side of the channel section of the lower frame member (left side is seen FIG. 6) may be used to mount on screws 64 or otherwise, the two corner pulleys of the two shade rail control mechanism, here corner pulleys 34D and 42D.

Reveal 18 may be provided with a vent 76 for passage of gas therethrough. Further, air frame mounting means 78 such as mounting stubs or mounting portion for mounting the vehicle window 10 to the aircraft. Likewise, channel mounted blind nuts 80 may be provided for attaching the reveal to the frame (see FIG. 1).

Figure 7A:
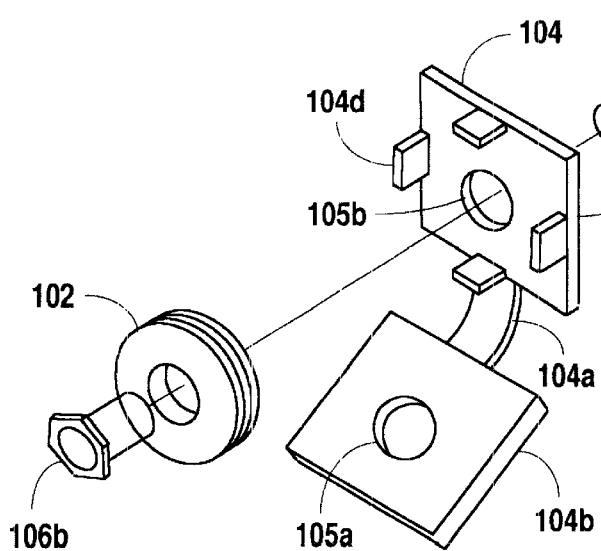
FIGS. 7A and 7B illustrate a pulley assembly that may be used with the invention.
Figure 7B:
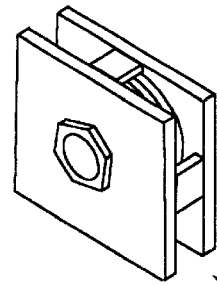

FIGS. 7A and 7B illustrate a pulley assembly 100 that may be used with the invention. The pulley assembly is designed to help prevent cord, cable or string that wind around it from falling off a wheel 102 therein. Wheel 102 is seen to ride on axle halves 106A and 106B which join together through holes 105A and 105B in a housing 104. The housing includes a base plate 104A and top plate 104B. These two plates are connection by member 104E. They pull over and join along legs 104D to form the rectanglar housing illustrated in FIG. 7B. When Applicant's pulley assembly 100 is used (anywhere a pulley is called for) it is easier to maintain the cord wrapped around wheel 102.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. In a vehicle window for a vehicle having an interior compartment, a window having:
    a curved inner lens;
    a generally rectangular frame having frame members including curved, side rails for joining the inner lens thereto;
    a shade for interference with the passage of light through the inner lens, the shade comprising a first fabric member with a first and a second edge, and a second fabric member with a first and a second edge, the first edge of the first fabric member for engagement with a frame member of the frame members of the rectangular frame;
    a first moveable shade rail for engagement with the first edge of the second member and the second edge of the first member of the shade thereto;
    and means cooperating with the first moveable shade rail to manually control the shade such that the shade moves adjacent the curved inner lens and such that the first fabric member may selectively cover all, some or none of the curved inner lens and the second fabric member may selectively cover all, some or none of the inner lens;
    a second moveable shade rail for engagement with the second edge of the second member;
    means to maintain alignment of the first moveable shade rail;
    means to maintain alignment of the second moveable shade rail.

2. The vehicle window of claim 1 wherein the means to manually control the shade includes a first cable loop mounted adjacent the frame members and attached to the first moveable shade rail and further including:
    a first handle attached to the first cable loop, wherein the first handle is slidably mounted adjacent
    the frame such that the movement of the handle will raise or lower the first moveable shade rail.

3. The vehicle window of claim 2 wherein the means to manually control the shade includes; a second cable loop mounted adjacent the frame members and attached to the second moveable shade rail; and further including: a second handle attached to the second cable loop wherein the second handle is slidably mounted adjacent the frame such that movement of the handle will raise or lower the second moveable shade rail.

4. The vehicle window of claim 1 further including a reveal.

5. The vehicle window of claim 1 further including an outer lens.

6. The vehicle window of claim 3 further including pulleys to entrain the two cable loops.

7. The vehicle window of claim 4 further including an outer lens engaged with the reveal.

8. The vehicle window of claim 1 wherein the shade material of the first fabric member differs in light transmissive properties from the second fabric member.

9. The vehicle window of claim 8 wherein the shade material is tubular.

10. The vehicle window of claim 8 wherein the shade material is pleated.

11. The vehicle window of claim 1 wherein the inner lens includes a decorative mask adjacent to the perimeter thereof.

12. The vehicle window of claim 1 wherein the two shade rails are "H" in cross section.

13. The vehicle window of claim 2 wherein the first cable includes a turn buckle.

14. The vehicle window of claim 2 wherein the second cable includes a turn buckle.

15. The vehicle window of claim 1 wherein the means to maintain alignment of the first movable shade rail includes a pair of cords, each cord of the pair engaging the frame, under tension, at the two ends thereof and engaging the first movable shade rail at opposite ends thereof, between the ends of the cord.

16. The vehicle window of claim 1 wherein the means to maintain alignment of the second movable shade rail includes a pair of cords, each cord of the pair engaging the frame, under tension, at the two ends thereof and engaging the second movable shade rail at opposite ends thereof, between the ends of the cord.

* * * * *